United States Patent [19]

Schmidt

[11] Patent Number: 4,512,380

[45] Date of Patent: Apr. 23, 1985

[54] APPARATUS FOR THE TRANSVERSE AND/OR LONGITUDINAL MACHINING OF WOODEN WORKPIECES

[75] Inventor: Erich Schmidt, Mauerbach, Austria

[73] Assignee: MZW Maschinenfabrik Zuckermann Pachtgesellschaft mbH, Vienna, Austria

[21] Appl. No.: 491,382

[22] Filed: May 4, 1983

[30] Foreign Application Priority Data

May 13, 1982 [DE] Fed. Rep. of Germany ....... 3218107

[51] Int. Cl.$^3$ ............................................... B27C 9/04
[52] U.S. Cl. ............................ 144/1 A; 144/145 R; 144/356; 144/134 R; 408/3; 408/35; 409/80; 409/198; 409/213; 409/224
[58] Field of Search ............... 408/3, 35; 409/80, 168, 409/192, 198, 211, 213, 217, 224; 144/144 R, 137, 145 R, 3 R, 1 R, 1 A, 356, 134 R

[56] References Cited

U.S. PATENT DOCUMENTS

| | | | |
|---|---|---|---|
| 3,602,094 | 8/1971 | Bardiau | 409/224 |
| 3,800,842 | 4/1974 | Schell | 144/145 R |
| 4,422,265 | 12/1983 | Branston | 409/198 |

Primary Examiner—W. D. Bray
Attorney, Agent, or Firm—Finnegan, Henderson, Farabow, Garrett & Dunner

[57] ABSTRACT

The invention relates to apparatus for the transverse and/or longitudinal machining of wooden workpieces, comprising a workpiece carriage for mounting a workpiece or a plurality of workpieces thereon and adapted to be displaced in the direction of the X-axis of a spatial X-Y-Z coordinate system along at least one transverse machining tool itself adapted to be displaced in the Y- and/or Z-axis for the machining operation. The object of the invention is to provide an apparatus of the above indicated type, which is of simple construction and by means of which the transverse machining of a workpiece can be carried out in a single mounting position of the workpiece and at a single machine location. In order to attain this object, the invention provides that the workpiece carriage comprises a mounting table adapted to be tilted about an axis parallel to the X-axis.

14 Claims, 16 Drawing Figures

APPARATUS FOR THE TRANSVERSE AND/OR LONGITUDINAL MACHINING OF WOODEN WORKPIECES

DESCRIPTION

The present invention relates to apparatus for the transverse and/or longitudinal machining of wooden workpieces, comprising a workpiece carriage for mounting a workpiece or a plurality of workpieces thereon and adapted to be displaced in the direction of the X-axis of a spatial X-Y-Z coordinate system along at least one transverse machining tool itself adapted to be displaced in the Y- and/or Z-axis for the machining operation.

Apparatus of the type set forth above is known for instance from AT-PS 316 849. For the transverse machining of workpieces of any type, the quoted reference provides a series of individual machines combined to form a finishing line. The workpieces are carried along this finishing line on the workpiece carriage, which is stopped in front of each machine for the respective machining operation to be carried out thereby. Each machine is adapted to carry out a particular transverse machining operation, for instance a drilling or cutting operation, shaping of a fillet, parting-off of a workpiece section etc.

Finishing lines of this type are profitable only for the mass-production of workpieces. They are unsuitable, however, for small-scale production, as the refitting and other down-times would be much too numerous and expensive to justify the processing of smaller lots of a magnitude of between 20 and 500 units per lot.

Such smaller lots are therefore usually processed by means of nonspecialized individual machines which are adjusted to the required finishing operations and are not linked to one another. This also leads to considerable adjustment down-times. There is the additional drawback that the workpieces have to be consecutively mounted on the various machines, which may result in inaccuracies of the finished product. In addition, the workpieces generally have to be manually transferred from one machine to the next, resulting in additional time losses.

It is an object of the present invention to provide an apparatus of the type set forth in the introduction, which is of simple construction and permits the transverse and/or longitudinal machining of a workpiece to be carried out with a single mounting operation at a given machine location.

In order to attain this object, the invention provides that the workpiece carriage comprises a mounting table adapted to be tilted about an axis parallel to the X-axis.

The apparatus according to the invention is of simple construction and allows the variable alignment of the mounted workpiece or workpieces. If it is assumed that the orientation of the tool within the apparatus remains unchanged, the tiltable mounting table permits five of the six sides of a cubic workpiece to be machined in a single mounting position. This is made possible by the tilt axis of the workpiece carriage. In the case of the workpiece surfaces extending parallel to the X-axis, it is thus possible to machine the surface itself, for instance in a surface finishing operation, as well as to carry out drilling operations. In the case of the end surfaces of the cubic workpiece, extending transversely to the X-axis, the assumed unchanged orientation of the tool permits only the finishing of these surfaces, the type of the operation to be carried out being obviously dependent on the type of the tool. The above explanations therefore relate only to the general accessibility of the workpiece.

The possibility to finish five of the six surfaces of a cubic workpiece in a single mounting position results in a reduction of the otherwise inavoidable mounting and adjustment downtime. Moreover, the single mounting operation in a single mounting position permits the product to be finished with considerably increased accuracy, as mounting misalignments are avoided. In the case of non-cubic workpieces, the machining of the corresponding workpiece surfaces offers the same advantages. The workpieces to be machined may be of any type, such as furniture components, for instance components of chairs or tables, rifle butts, sports equipment of any type, for instance bows, tennis rackets, cricket bats, golf clubs, ski components, components for musical instruments, for instance guitar necks and the like.

The invention is particularly directed to the machining of solid wood, but is also applicable to the machining of materials of similar cutting properties.

The possibility of tilting the workpiece may also be made use of for the machining operation itself. To achieve this there is preferably provided path control means, such as CNC path control means, for controlling the movements of the mounting table about its tilt axis. CNC path control is a computerized control device that can be used for automatically coordinating movements of the mounting table. It is generally to be noted that this or any other type of path control means is also provided for the movements of the workpiece carriage and of the transverse machining tool. Suitable adjustments drives and control apparatus therefor are generally known.

In an advantageous embodiment the invention provides that the mounting table is designed as a swing provided at both of its ends with wings projecting unidirectionally and perpendicularly to the table's plane and carrying the bearings for the tilting axis.

This construction of the mounting table permits the workpiece to be disposed in the tilting axis, resulting in particular advantages for the machining operation. The workpiece may be pivoted about the tilt axis in the same manner as if it were clamped on the carrier mandrel of a clamping support. As the mounting table is tilted, the workpiece is simultaneously tilted as well, since it is rigidly mounted on the mounting table. This is advantageous with regard to the control of the machining operation.

In order to permit the workpiece surfaces aligned transversely of the X-axis to be also machined with the tool being maintained at a constant orientation, it is advantageous to provide the mounting table with a pivot table adapted to be pivoted about an axis perpendicular to the X-axis. The pivot table may be pivoted about its pivot axis in any position of the mounting table, in order for instance to make the end surfaces of the workpiece fully accessible for the transverse machining operation. If the pivot table is pivoted to a position substantially transverse to the X-axis, and the workpiece is aligned with the tool, the above captioned tool, while being retained at its unchanged orientation, may be used for forming projections or depressions on the end surface, such as spigots and bores, respectively. The various transverse machining operations may be carried out by the use of universal tools adapted to engage the workpiece with their end faces as well as with their circumferential surfaces, These tools may be employed for surface finishing operations as well as for forming spigots, bores and the like.

In this context, there is preferably provided path control means, particularly CNC path control means, for the movements of the pivot table about its pivot axis.

In order to make all sides of the workpiece accessible for the machining operation, while still ensuring a reliable mounting of the workpiece, an advantageous embodiment of the invention provides that the pivot table is provided with clamping elements disposed opposite one another. These clamping elements are designed for clamping or mounting the workpiece from opposite sides, so as to enable all sides of the workpiece to be successively machined. During the change from one clamping element to the other, the workpiece is maintained at an unchanged mounting position, as the change of the clamping elements may be carried out with a time overlap.

In order to reduce the movements of the tools during the transverse machining operation to a minimum, it is advantageous to mount the workpiece on the pivot table with its final outer dimensions centered with respect to the tilt axis.

In a further advantageous embodiment the invention provides that the pivot axis extends through the longitudinal and transverse center of the pivot table. This results in the pivot table being mounted in its symmetry plane. It may be equilibrated in order to reduce the load on its bearings during the pivoting operation to a minimum. The same is applicable with regard to the workpiece. The above mentioned centering during the mounting operation may also be carried out to the effect that the workpiece has its center of gravity located on the pivot axis. In practical operation it will always be endeavoured to locate the center of gravity of the workpiece as close as possible to the pivot axis, and to simultaneously achieve a longitudinal centering for reducing the machining movements to a minimum.

In another embodiment the invention provides that the workpiece carriage comprises a vertical base plate, the two ends of which are provided with carrier arms projecting in the direction of the tool for mounting the mounting table thereon. The base plate is vertically oriented in order to facilitate chip removal. At the same time, this orientation provides for a free space for the pivotal movements of the pivot table.

In this context it is also advantageous if the distance between the tilt bearing disposed on the carrier arms and the base plate corresponds to at least half the overall length of the pivot table. This enables the pivot table together with the mounting table to be tilted in a full circle about the tilt axis, even if the pivot table is oriented transversely of the mounting table.

For the horizontal pivot movement of the pivot tables it is also advantageous if the carrier arms are inclined upwards at an angle of about 45° with respect to the vertical base plate. This provision permits the frame of the apparatus to be of reduced height, while the horizontal pivot movement may be ensured even if the carrier arms are relatively short.

The mounting and/or pivot table is preferably adapted to be locked at selectively determined positions by the use of a cone clutch. This cone clutch serves to rigidly lock the respective table in the selected position, so that inaccuracies of the machining operation due to yielding of the respective table are avoided. In a particularly simple arrangement, the cone clutch may be located in concentric relationship to the tilt and/or pivot bearing.

An exemplary embodiment of the invention shall now be described with reference to the accompanying drawings, wherein.

Figure 1:
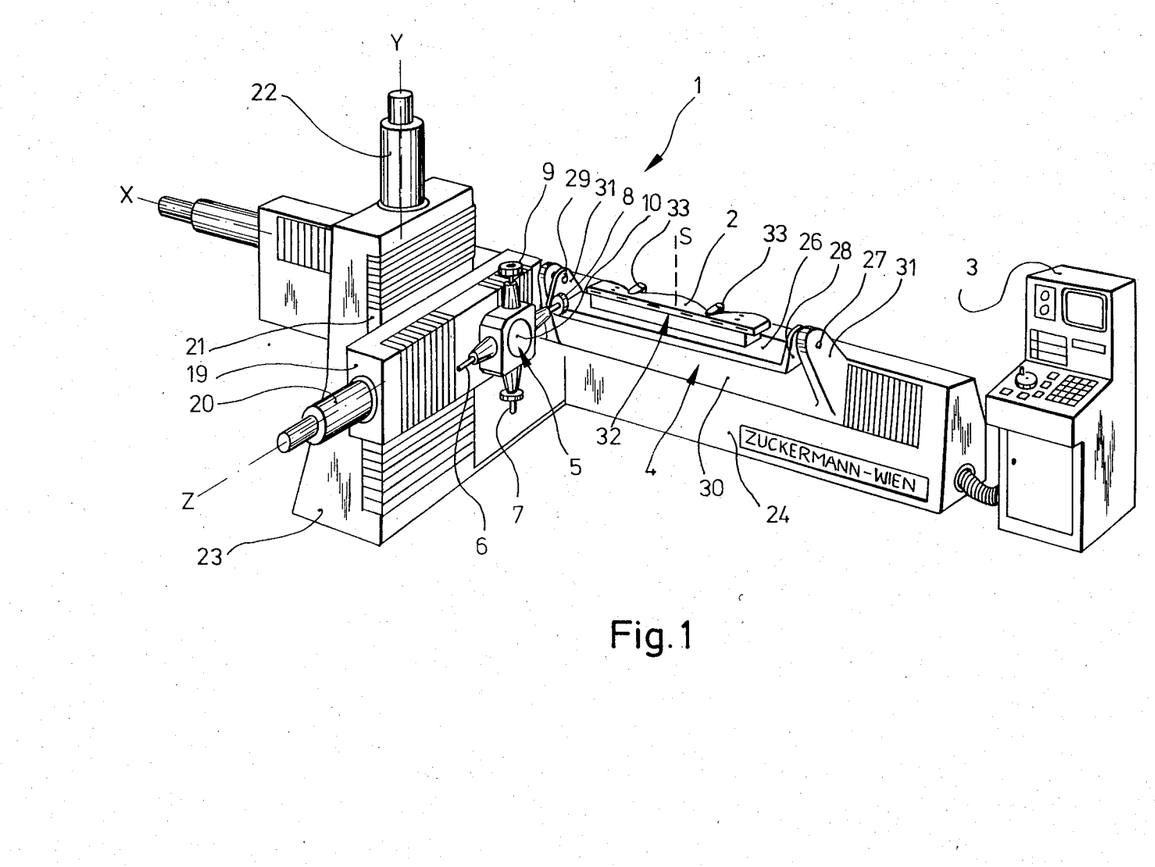
FIG. 1 shows a diagrammatic perspective view of an apparatus according to the invention.

Shown in FIG. 1 of the drawings is a simplified representation of an apparatus 1 for the transverse machining of wooden workpieces 2. Prior to the description of details of apparatus 1, a survey of the main components of the apparatus shall be taken with reference to FIG. 1.

Apparatus 1 is mainly intended for the transverse machining of workpieces made of solid wood. It may also be used, however, for longitudinal machining operations of workpieces, including workpieces of other materials having cutting properties similar to those of solid wood.

In the present example, apparatus 1 is equipped with CNC path control means permitting the machining of workpieces 2 in a single mounting position to be carried out in a fully automatic process. A control device 3 formed as a separate unit is located at one side of the effective working range of the machine and connected to the apparatus via conventional control circuitry.

The control device of the apparatus basically consists of an electronic computer adapted to supply control parameters in the form of electric signals to individual motor control units. The control units themselves generate an electric voltage proportional to the input signal, the magnitude of such voltage determining for instance the rotary speed of DC motors associated with axial drive units of the apparatus. Each such drive motor is provided with a a tacho-generator for nominal- /actual speed comparison, and an incremental rotary sensor for sensing the actual rotary position.

The path control device controls the movements of a workpiece carriage 4 along a horizontal X-axis, of two tool carriages 19 and 21 along a Y-axis and a Z-axis, respectively, both of which extend perpendicularly with respect to one another and to the X-axis, of a mounting table 26 including a tilt axis 27 extending parallel to the X-axis, and of a pivot table 32 about a pivot axis S perpendicular to the X-axis.

As already explained, the Y- and Z-axes are associated with the tool assembly of the apparatus. The Y-axis extends vertically and is associated with the vertical positioning of the tool or tools. The Z-axis extends in an horizontal plane, as does the X-axis, and is associated with the horizontal movements of the tool towards and away from the workpiece for the machining operation.

Figure 6:
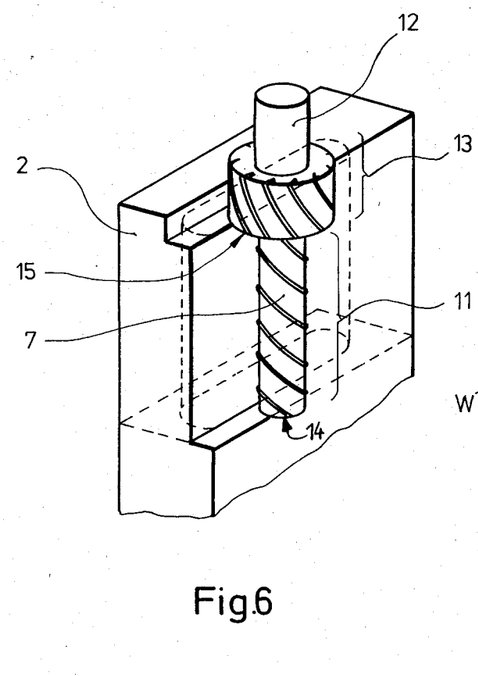
FIGS. 6 and 7 show perspective views of a universal milling tool for a variety of uses.
Figures 7, 8:
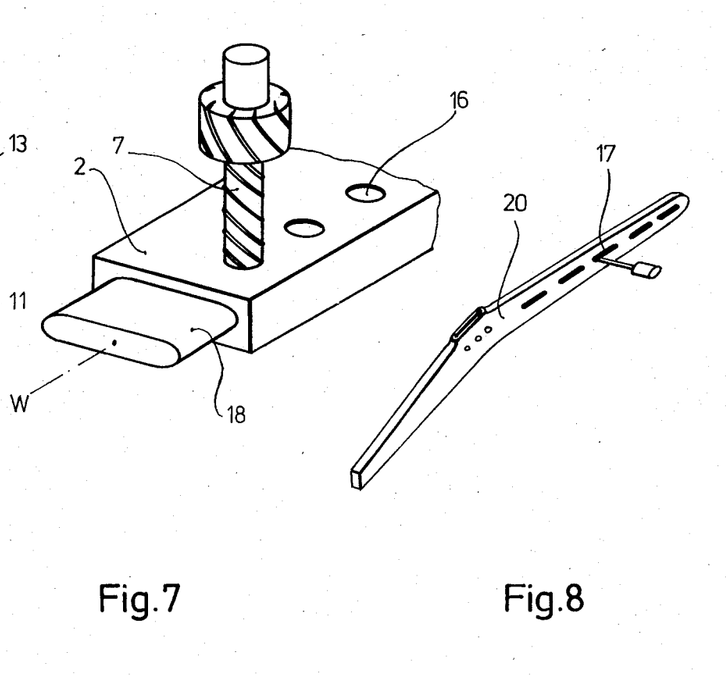
FIG. 8 shows a perspective view of a workpiece machined by the use of the universal tool shown in FIGS. 6 and 7.

In the embodiment shown, a revolving tool carrier head 5 is equipped with four different tools 6, 7, 8 and 9. Tools 6 to 9 are arranged at a circumferential spacing of 90° about the periphery of revolving head 5, itself mounted for rotation about an axis 10 parallel to the X-axis. Tool 6 is a twist drill, tool 7 is a universal milling tool such as shown by way of example in FIGS. 6 and 7, comprising a cylindric section 11, a drive connection spindle 12, and a large-diameter cylindric milling head section 13 disposed between section 11 and spindle 12. Both milling sections 11 and 13 have their end faces 14 and 15, respectively, formed with cutting edges, which may additionally be employed for the machining operation, as shown in FIGS. 6 and 7. The cross-hatched areas in FIG. 6 represent the machined portions of workpiece 2. From this figure it is evident that the machining operation is carried out not only by the circumferential surfaces of milling sections 11 and 13, but also by the end surfaces 14 and 15. The transverse machining operation shown thus results in an L-shaped recess in workpiece 2.

FIG. 7 shows the employ of milling tool 7 solely for drilling holes 16. The tool is arranged in perpendicular orientation to the respective surface of the workpiece and is then advanced in its axial direction until the desired depth of the hole is attained.

FIG. 8 shows in diagrammatic form a transverse machining operation as carried out on a workpiece 2. In this case, milling tool 7 is transversely advanced for forming an elongate hole 17 in workpiece 2. The width of elongate hole 17 may be greater than that of section 11 of tool 7. To achieve this, the milling tool is advanced along parallel paths.

The elongate tenon 18 of workpiece 2 shown in FIG. 7 has likewise been formed by means of universal milling tool 7, although at a different orientation thereof with respect to workpiece 2. In this orientation, the rotary axis of tool 7 extends parallel to the workpiece axis W, and the tool is advanced along a predetermined machining path similar to the one applied for forming the elongate holes 17 shown in FIG. 8, for removing material about the periphery of tenon 18.

Figure 16:
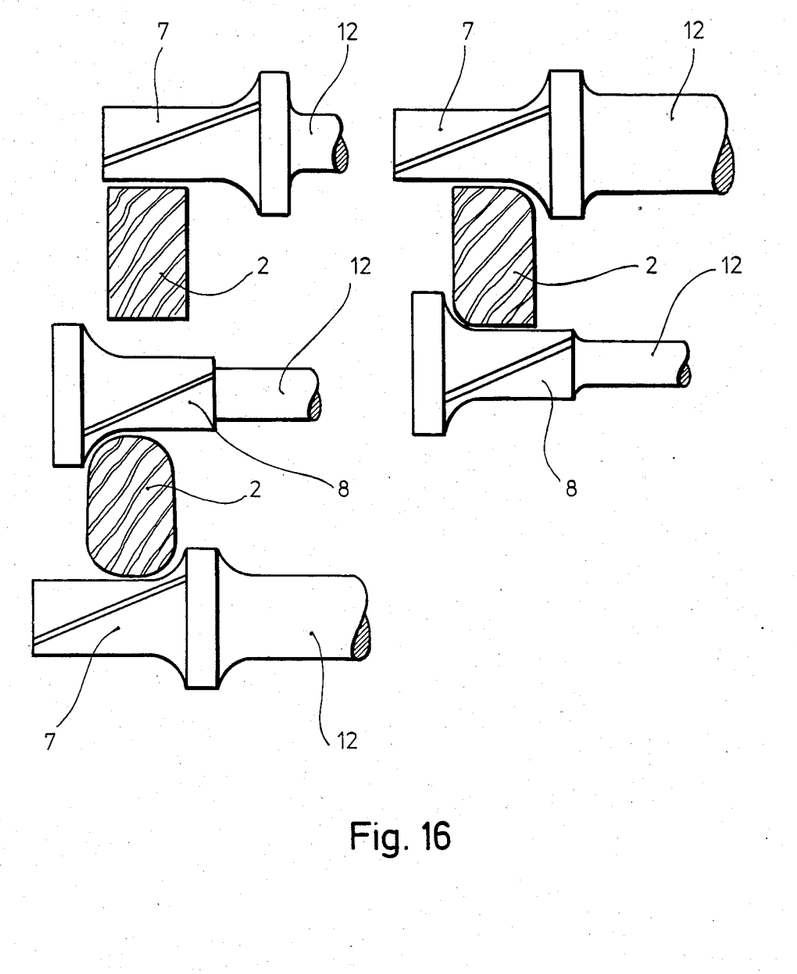
FIG. 16 shows a diagrammatic representation of universal tools and the possible uses thereof.

Milling tool 7 may also be employed as a universal tool for simultaneously or successively machining plane surfaces and inclined or rounded surface portions. The two upper illustrations and the lowermost illustration in FIG. 16 show a modification of the milling tool. In this modification, the cutting edges of section 11 are arcuately extended up to the periphery of milling section 13. The cylindric portion of section 11 may thus be employed for machining plane surfaces, while the arcuate extensions of its cutting edges may be used for forming champered edges on workpiece 2 as shown at upper right and lower left in FIG. 16.

Tool 8 is likewise a universal milling tool, its shape being essentially complementary to that of tool 7, as clearly evident from FIG. 16. That is, the shape of tool 8 is essentially the same as that of tool 7, although inverted with respect to spindle 12, comprising a cylindric section for machining plane surfaces and arcuately extended cutting edges for forming a chamfer.

This tool may be employed in the same manner as tool 7, so that the workpiece is engaged solely by the cylindric section or by the arcuate section. Alternatively, both sections may of course be employed simultaneously for a machining operation. This is also evident from the various illustrations of FIG. 16.

Tool 9 is a disk-shaped milling tool of conventional type.

Revolving head 5 is mounted on a first tool carriage 19 adapted to be displaced in the direction of the Z-axis by means of a CNC path-controlled feed drive 20.

Figure 2:
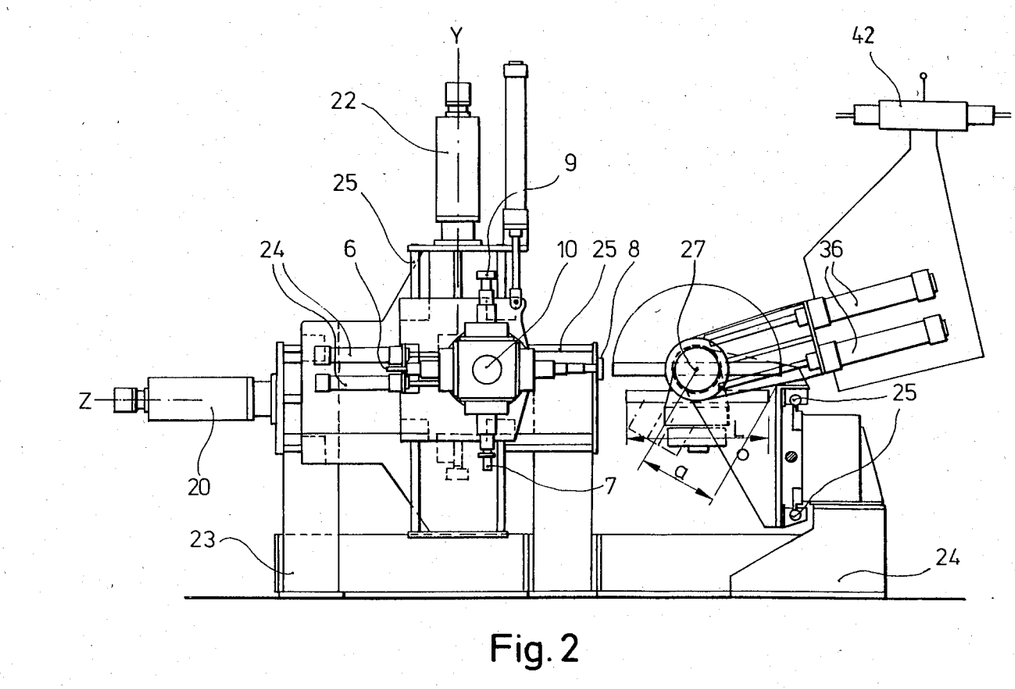
FIG. 2 shows a side view of the apparatus shown in FIG. 1.

Tool carriage 19 itself is mounted on a second tool carriage 21 mounted on a frame 23 for vertical movement in the direction of the Y-axis by means of a CNC path-controlled feed drive 22. The first and second carriages serve to advance the tool selected for the machining operation in the direction of the Z- and Y axes, respectively. For the machining operation, the selected tool is rotated to the position opposite workpiece 2, as shown in FIGS. 1 and 2 with respect to tool 8. In this position, the selected tool is oriented parallel to the Z-axis. The rotation of revolving head 5 is accomplished by means of oppositely rotating adjustment drives, for instance pneumatic drive means, connected to one another via a guided control chain. Frame 23 itself is stationary.

Figure 3:
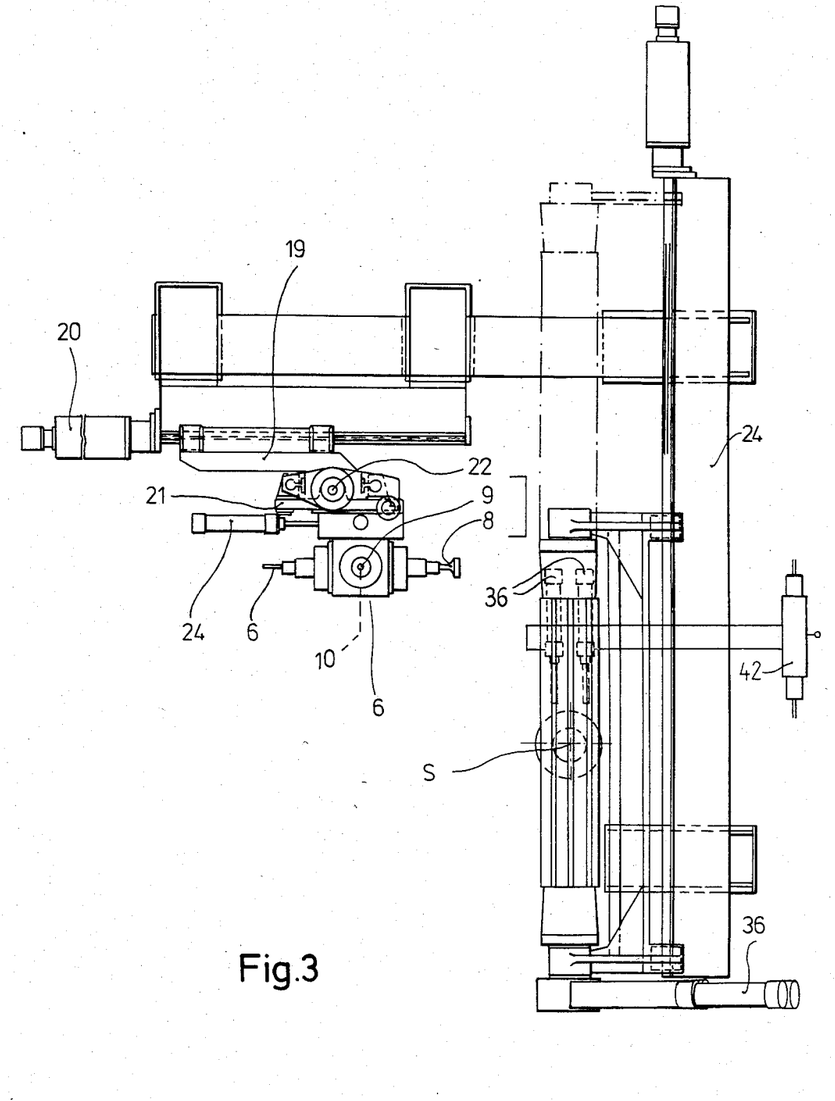
FIG. 3 shows a top plan view of the apparatus of FIG. 3.

As already indicated, workpiece carriage 4 is mounted for CNC-controlled movement in the direction of the X-axis, and carried by a second frame 24 which is independent of the tool carrying frame 23 and is stationarily mounted on a supporting ground surface substantially at right angles to the longitudinal axis of first frame 23. Workpiece carriage 4 as well as tool carriages 19 and 21 are each mounted on guide rods 25 as particularly shown in FIGS. 2 and 3. The thus formed guide assemblies are sealed by means of bellow sleeves as shown in FIG. 1.

Workpiece carriage 4 comprises a mounting table 26 adapted to be tilted about a tilt axis 27 extending parallel to the X-axis. In the present case, this means that the tilt axis is horizontally aligned.

The mounting table is of a swing-type construction and has both of its ends provided with wings 28, 29 extending in one and the same direction perpendicular to the table's plane and carrying the bearings defining tilt axis 27. The mounting table is thus of U-shaped configuration, with the two wings forming the free-ended legs of the U, while the table plane constitutes the connecting central leg.

Workpiece carriage 4 further comprises a vertical base plate 30 adapted to facilitate chip removal and workpiece discharge by gravity at the end of the machining operation.

Both ends of base plate 30 are provided with carrier arms 31 projecting towards the tool assembly and serving to mount the mounting table therein. Carrier arms 31 are inclined upwards at an angle of about 45° with respect to base plate 30. Frame 24 is of rather reduced height, having an upper end surface above which the carrier arms project a certain distance.

Mounting table 26 carries a pivot table 32 mounted in the trough formed by its U-shaped configuration for rotation about a pivot axis S perpendicular to the mounting table plane. Pivot axis S is located at the longitudinal and transverse center of the mounting table plane, i.e. in a point-symmetrical position with respect to the table plane. Pivot axis S extends perpendicular to the X-axis. In order to enable pivot table 32 to be pivoted for a full circle of 360°, the distance between the tilt bearings carried by carrier arms 31 of base plate 30 and wings 28, 29 of mounting table 26 corresponds to at least half the length of pivot table 32, so as to provide for a sufficient free space for the pivotal movement of the pivot table.

Mounting table 26 is provided with conventional dovetail grooves for anchoring clamping elements 33. Such clamping elements may also be affixed, however, to the backside or the edges of the table, as shown by way of example in FIGS. 14 and 15. These figures also show the arrangement of the clamping opposite one another, provided for enabling workpiece 2 to have all of its sides machined. The operation of the clamping elements is evident from FIG. 14. As in this figure tool 7 is in operative engagement with the lower longitudinal edge of workpiece 2, the clamping elements 33 located at the upper longitudinal edge of mounting table 26 are in their engagement position, while the lower clamping elements 33 are retracted out of the path of tool 7 so as not to interfere with the machining operation carried out thereby. If the tool is subsequently to be employed for machining the other longitudinal edge, i.e. the upper workpiece edge in FIG. 14, the lower clamping elements 33 are advanced towards workpiece 2 to clamp the latter therebetween in addition to the clamping action of the upper clamping elements, which are subsequently released and retracted to make the upper longitudinal workpiece edge accessible for the machining operation. In this context it is to be noted that there occurs merely an exchange of the clamping elements without any change in the clamped position of the workpiece.

In the embodiment shown, the clamping elements are actuated by pneumatic cylinders.

In addition to the described clamping elements, the mounting table may be provided with centering stops 34 such as longitudinal and lateral stops for accurately positioning the workpiece.

Figure 13:
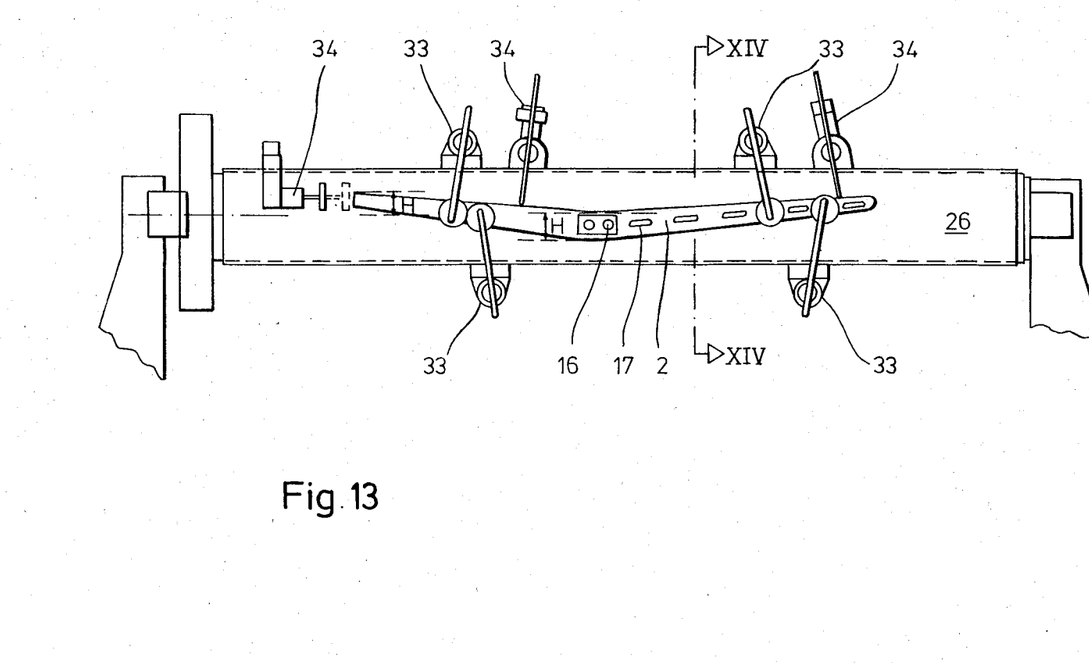
FIG. 13 shows a side view of the mounting table equipped with clamping elements and positioning stops.
Figure 14:
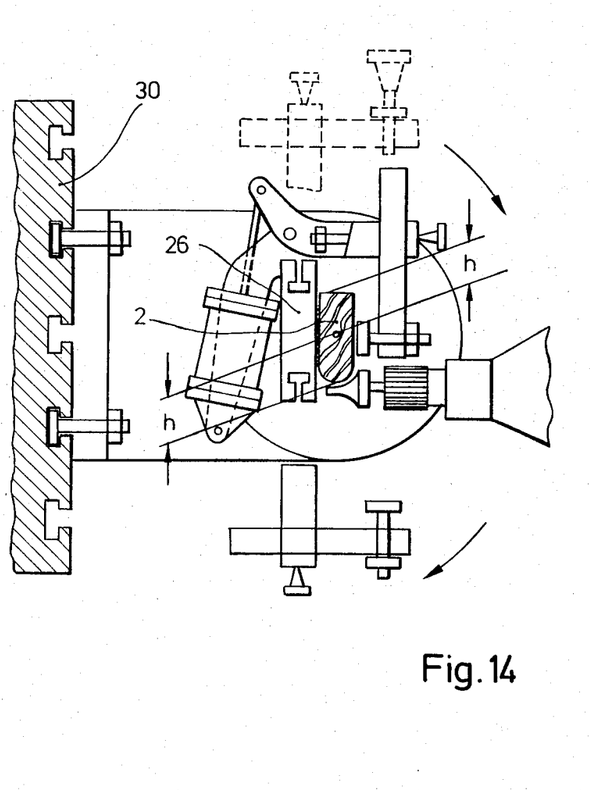
FIG. 14 shows a sectional view of the clamping element-equipped mounting table, taken along the line XIV—XIV in FIG. 13.

In order to keep the operating strokes of the tools as short as possible, workpiece 2 is preferably clamped on mounting table 26 in a centered position with respect to a given axis. As shown in FIGS. 13 and 14, the cross-sectional center of the workpiece is exactly aligned with tilt axis 27, as demonstrated by the dimensions h and H.

Figure 11:
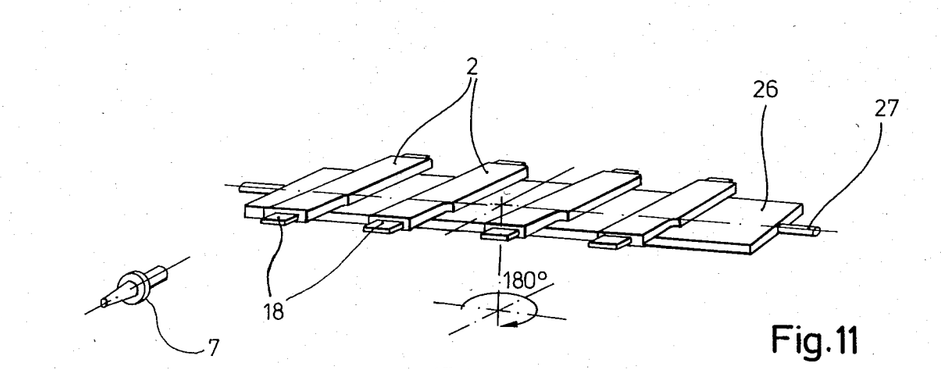
FIGS. 11 and 12 show a diagrammatic perspective view of the mounting table with a plurality of seat frame members mounted thereon for the formation of spigots, slot openings and dowel holes.
Figure 12:
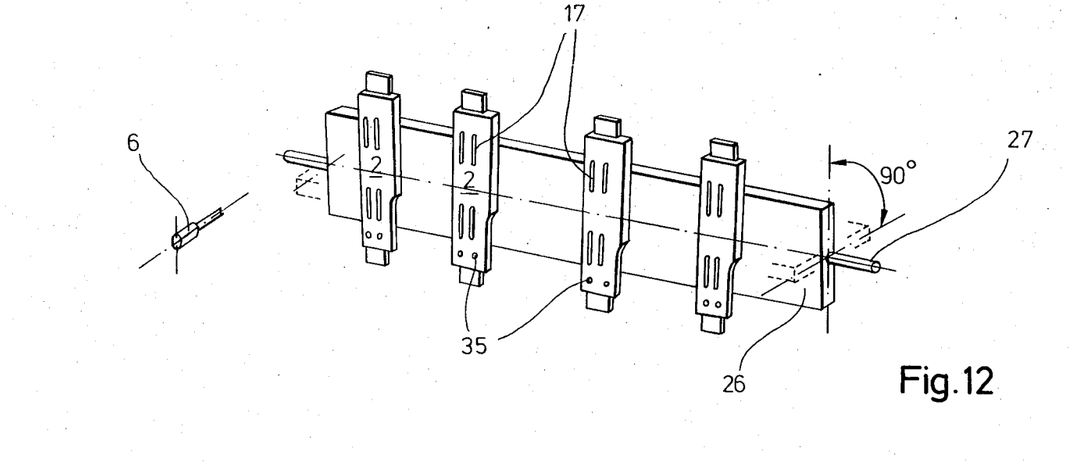

It is not essential, however, that the workpieces are arranged with their longitudinal axis in the longitudinal direction of mounting table 26, as they may also be disposed in a transverse position. FIGS. 11 and 12 show a plurality of workpieces 2, namely, seat frame members, disposed side by side at right angles to tilt axis 27.

In this position shown in FIG. 11, universal milling tool 7 is initially employed for forming the tenons 18 at the first ends of the workpieces in the manner already explained with reference to FIG. 7.

After the machining of the first ends of the workpieces has been finished, the pivot table is pivoted by 180°, so that the second ends of the workpieces may also be provided with tenons.

Subsequently, mounting table 26 is tilted about an angle of 90° to the position shown in FIG. 12, so that drill 6 may be used for forming the elongate holes 17 and dowel holes 35 in the side surfaces of workpieces 2.

Figure 9:
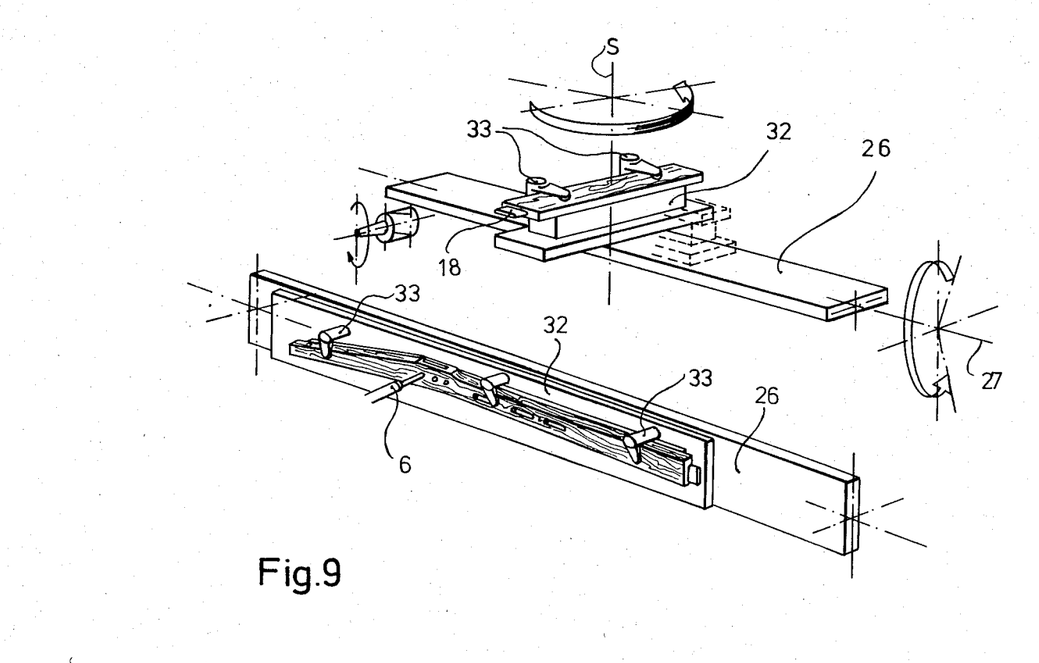
FIG. 9 shows a diagrammatic perspective view of the mounting and pivot tables, indicating the freedom of movements for the two tables.
Figure 10:
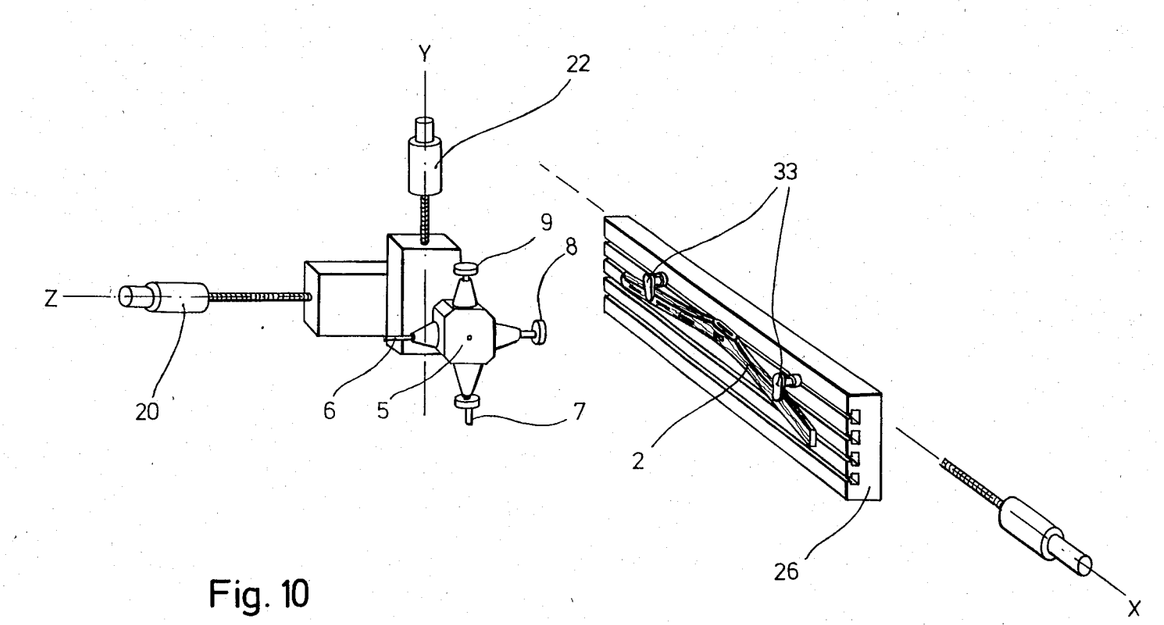
FIG. 10 shows a diagrammatic perspective view of the pivot table, indicating the spatial X-Y-Z axis coordinate system.

A machining operation in which the pivot table is locked in a position transverse to the mounting table is shown in FIG. 9. For the formation of tenons 18, the pivot table together with workpiece 2 is oriented transversely of tilt axis 27. For the machining of the side surfaces of workpiece 2, pivot table 32 is subsequently oriented parallel to tilt axis 27, and together with the mounting table tilted about an angle of 90° in the direction of the tool, such as shown in the lower part of FIG. 9.

The movements of mounting table 26 and pivot table 32 are accomplished by means of CNC-controlled adjustment drives 36, consisting in the present embodiment of paired hydraulic actuators connected to one another via a control chain and controlled by a proportional valve 42 itself actuated by the control unit. The adjustment drives 36 are clearly visible in FIGS. 2, 3 and 4, while they have been omitted in FIG. 1 for the sake of clarity.

Figure 4:
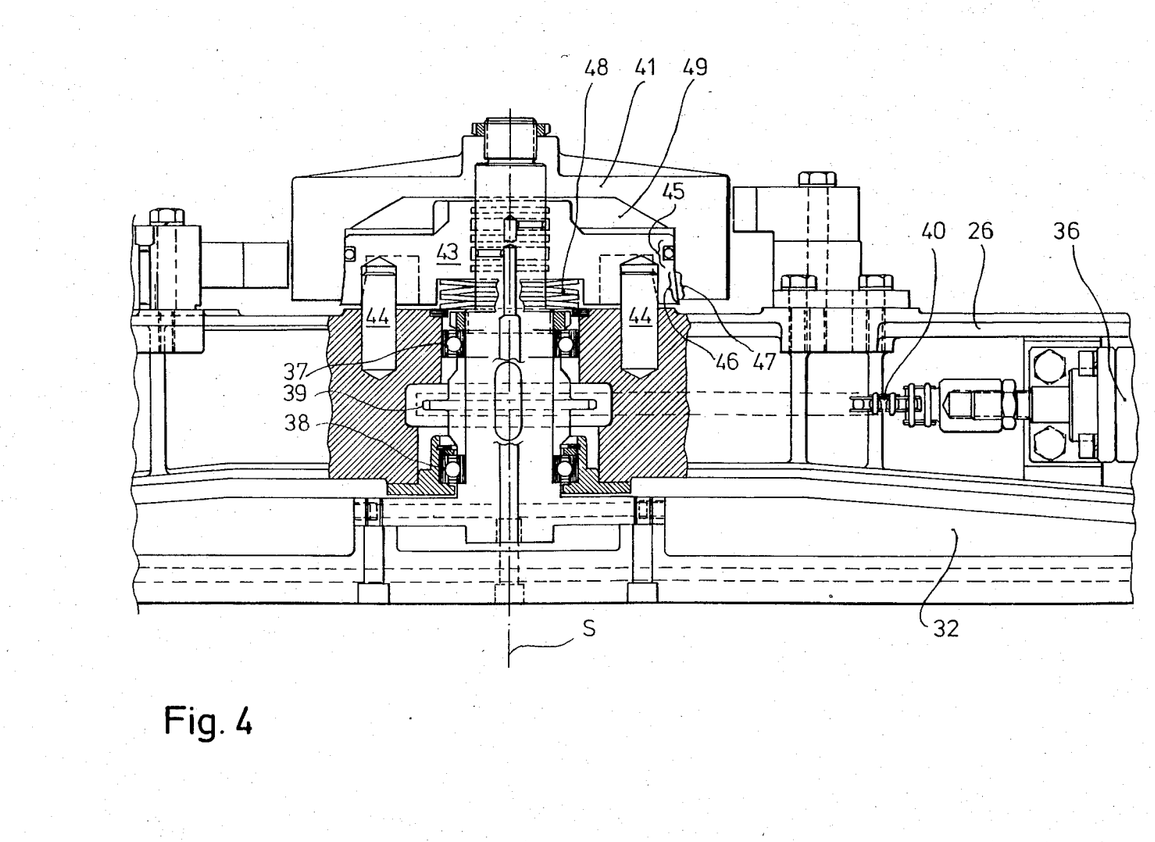
FIG. 4 shows a sectional view of the pivot bearing of the pivot table located on the mounting table.

FIG. 4 shows a longitudinal section through mounting table 26 and pivot table 32. The pivot table is rotatably mounted on mounting table 26 by means of two ball bearings 37 and 38. Between the ball bearings there is provided a sprocket 39 for engagement with the control chain 40 actuated by the adjustment drive 36. The positional control is effected with the aid of rotary field sensors.

The pivot axis S of pivot table 32 is extended towards the backside of the mounting table so as to project therebeyond. The projecting end of pivot axis S carries a yoke 41 non-rotatably affixed thereto.

In order to enable the pivot table to be locked in any position, the cup-shaped yoke cooperates with a cone clutch 43. Clutch 43 is arranged concentric with pivot axis S within the cup-shaped recess of the yoke so as to be substantially enclosed by the latter. The cone clutch is mounted on pivot axis S for movement therealong, and is non-rotatably connected to mounting table 26 by means of bolts 44. The peripheral surface of clutch 43 is formed with a cylindric section 45 and an annular conical section 46 cooperating with a complimentary conus surface 47 of the yoke. The yoke is locked with respect to the cone clutch by frictional engagement between annular conical section 46 and complementary conus surface 47. Cone clutch 43 is continually biased into engagement with yoke 41 by a belleville spring washer stack 48 supported by mounting table 26. For releasing the cone clutch, a prssure fluid is supplied to an annular chamber 49, whereby conical section 46 is axially retracted from complementary conus surface 47, so that the pivot table can be rotated.

An analogous bearing and locking arrangement is provided for the tilt bearing assembly of the mounting table.

Figure 5:
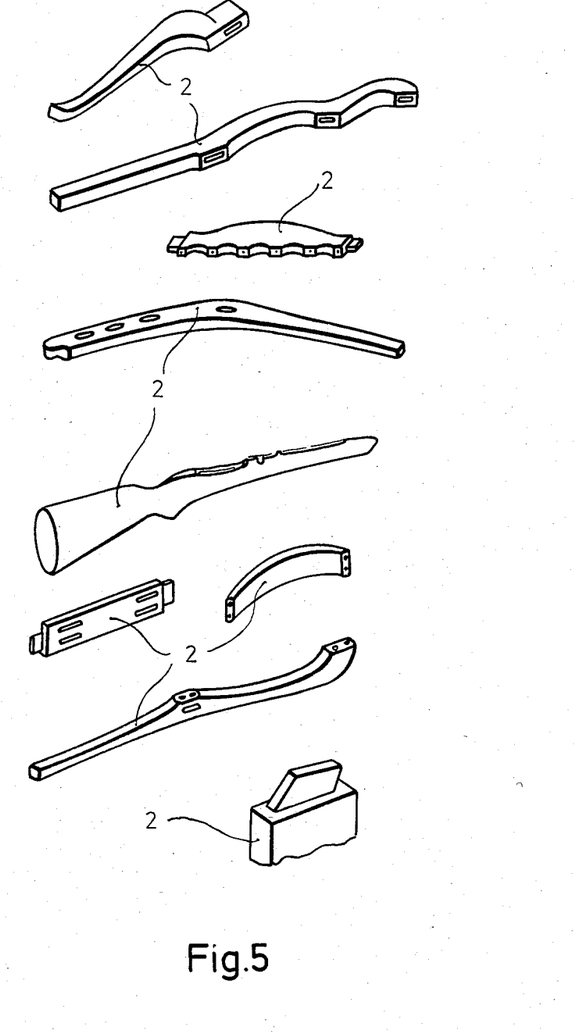
FIG. 5 shows a perspective view of various workpieces.

The apparatus according to the invention serves particularly for machining solid wood workpieces of the type shown by way of example in FIG. 5. The workpieces can be machined at their longitudinal sides, at their end surfaces and along the edges of such surfaces, transverse feed machining operations being also possible such as for forming tenons and holes or recessed chambers in rifle butts. Tenons and holes may also be oriented at oblique angles to the longitudinal axis of the workpiece, as shown by way of example at the lowermost workpiece 2 in FIG. 5.

In preparation of the machining operation, the blanks or pre-shaped workpieces may be manually or automatically fed to the pivot table to be accurately positioned and, if need be, centered with regard to weight and/or configuration, prior to be clamped by means of clamping elements 33.

The control unit is fed with the program for the machining operation to be carried out. The revolving head has been equipped with the tools required for the selected machining operation, whereupon the control unit automatically controls all further adjustment, clamping and machining operations. In the described example the individual tool and workpiece carriages and tables, respectively, are driven by DC motors via ball-and-worm spindle transmissions. As already explained hereinbefore, each of the drive assemblies to be controlled is provided with a rotary sensor for sensing the actual position, and with a tacho-generator for the nominal-/actual rotary speed comparison.

Each workpiece is positioned on the pivot table and on the mounting table in such a manner that the longitudinal and transverse machining operation can be carried out in the most suitable manner with regard to work efficiency. If the clamping elements are arranged so as to interfere with certain machining steps, for instance with the machining of the edges, they can be exchanged in timely overlapping relationship against oppositely located clamping elements operative to clamp the workpiece from the opposite side, so that the clamping position of the workpiece remains unchanged. If desired, however, the clamped position may of course be varied, for instance by the use of an automatically operated workpiece clamping unit.

If the control program for any given workpiece has once been established, it can be stored in a program card index or the like for use in subsequent repeat machining operations. The apparatus may then be set up for such repeat operations by merely adjusting the clamping arrangement to the respective workpiece and feeding the stored program to the control unit, resulting in setup times of only a few minutes. Tool changes can be carried out similarly rapid. For the machining operation, including the finishing operations, the workpiece has to be mounted or clamped only once.

Figure 15:
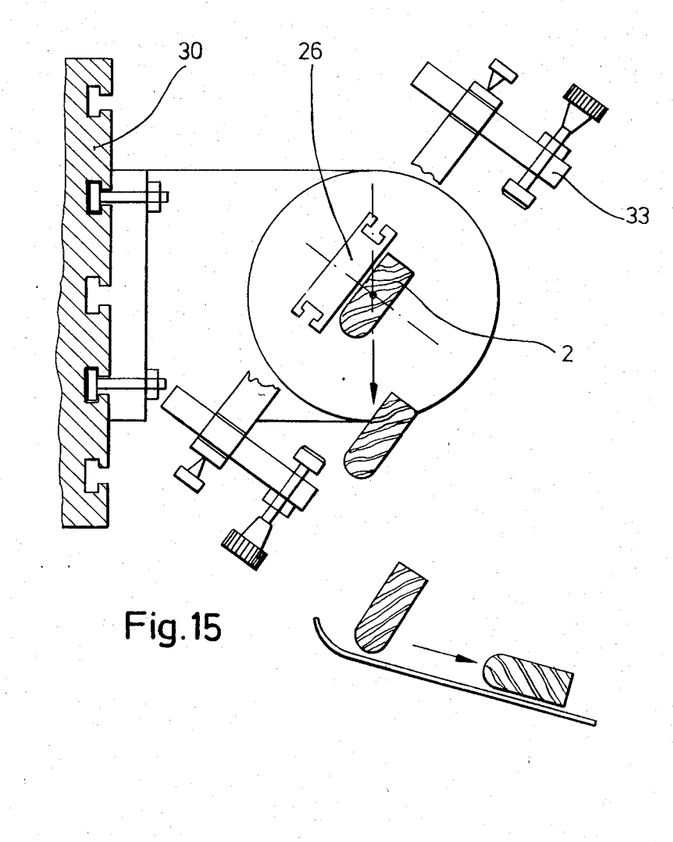
FIG. 15 shows a diagrammatic representation of the mounting table equipped with oppositely located clamping elements shown in the release position.

With the apparatus according to the invention, the workpieces can be finished to a final condition preparatory to painting or similar surface treatment. FIG. 15 shows the manner in which the workpieces can be ejected by the use of oppositely arranged clamping elements. To this purpose, the pivot table is tilted to an angle of about 45° with respect to the vertical, so that the workpiece comes to a position below the pivot table. This results in the lower clamping elements being retracted to a position permitting the workpiece to drop vertically downwards. If there are no lower clamping elements provided, the upper clamping elements may just be released in the position shown in FIG. 14, so that the workpiece drops vertically downwards without any interference.

For certain workpieces it may be advantageous to support them on the pivot table with the aid of spacer elements. In this manner it is possible to also machine the edge portions of the workpiece adjacent the pivot table surface.

The revolving head 5 with the tools 6, 7, 8 and 9 may be moved to the correct operating position in the direction of the Y- and Z-axes by means of the tool carriages 19 and 21, respectively. It is also possible, however, to mount the revolving head at a stationary position, and to provide two further degrees of freedom in the Y and Z directions for the workpiece carriage, for instance by the employ of carriages similar to tool carriages 19 and 21.

For the sake of completeness it shall be pointed out that the workpiece carriage 4 with the workpiece mounted thereon is advanced along the operating tool in the X-direction for carrying out machining operations proceeding in the X-direction. For localized machining operations the workpiece carriage is stopped until such operations are finished.

I claim:

1. In an apparatus having X-Y-Z coordinates for the transverse and/or longitudinal machining of wooden workpieces, comprising a workpiece carriage for mounting a workpiece or a plurality of workpieces thereon, said carriage being adapted to be displaced in the longitudinal direction of the X-axis of the apparatus and at least one transverse machining tool adapted to be displaced in the Y- and/or Z-axis of the apparatus for the machining operation, the improvement comprising a mounting table on the workpiece carriage for mounting the workpiece adapted to be tilted about an axis parallel to said X-axis.

2. The apparatus of claim 1, including path control means for controlling movements of said mounting table about its tilting axis.

3. The apparatus of claim 1, in which the mounting table comprises a flat, plane surface having wings at each end which project unidirectionally and perpendicularly to the table's plane surface to provide a U-shaped configuration to the mounting table and bearings mounted in each wing for pivotally supporting the table about its tilting axis.

4. The apparatus of claim 1, in which said mounting table has a pivot table mounted on it for pivotal movement about an axis extending perpendicular to said X-axis and the tilting axis.

5. The apparatus of claim 4, including control means for controlling movements of said mounting table about its tilting axis and movements of said pivot table about its pivot axis.

6. The apparatus of claim 4, including clamping elements on said pivot table for holding the workpiece disposed opposite one another.

7. The apparatus of claim 6, in which the workpiece can be clamped on said pivot table with its final outer dimensions centered with respect to the tilting axis.

8. The apparatus of claim 4, in which said pivot axis extends through the longitudinal and transverse center of said pivot table.

9. The apparatus of claim 4, in which the workpiece carriage comprises a vertical base plate and carrier arms at each end that project in the direction of the tool, said mounting table being mounted to the projecting arms for movement about the tilting axis.

10. The apparatus of claim 9, in which the distance (a) between the tilting axis and said base plate corresponds to at least half of the total length of said pivot table.

11. The apparatus of claim 9, in which said carrier arms are inclined upwardly at an angle of about 35° with respect to the vertical base plate.

12. The apparatus of claim 4, in which said pivot table can pivot about an angle of 360°.

13. The apparatus of claim 4, including means for locking the pivot table in selectively determined positions.

14. The apparatus of claim 13, in which the means for locking the pivot table comprises a cone clutch disposed at a centered position with respect to said tilting axis.

* * * * *